Oct. 18, 1949.   R. G. ADAMS ET AL   2,485,346
AUTOMATIC ELECTRIC REGULATING SYSTEM
Filed June 27, 1946
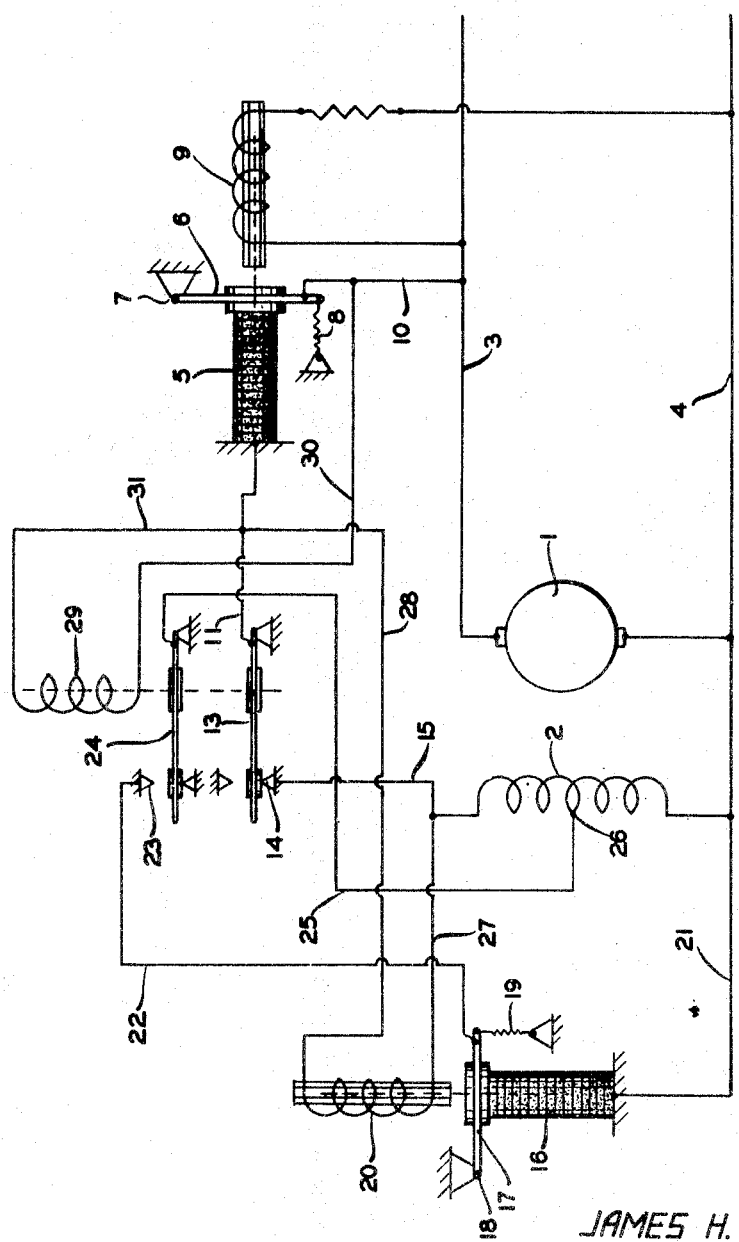
INVENTORS
JAMES H. JOHNSTON
RALPH G. ADAMS
BY
ATTORNEY Patented Oct. 18, 1949

2,485,346

UNITED STATES PATENT OFFICE 2,485,346

AUTOMATIC ELECTRIC REGULATING SYSTEM

Ralph G. Adams, Hackensack, and James H. Johnston, Paramus, N. J., assignors to Bendix Aviation Corporation, Teterboro, N. J., a corporation of Delaware Application June 27, 1946, Serial No. 679,640

14 Claims. (Cl. 322—24)

1

The present invention relates to an automatic electric regulating system for a variable speed generator.

An object of the invention is to provide novel regulating means, which will operate efficiently through a very wide range of fluctuations in electrical conditions.

Another object of the invention is to provide a novel regulating system having a first regulator which exercises the desired control up to a certain predetermined practical limit, beyond which regulation is effected by a second regulator.

Another object of the invention is to provide novel means for cutting the second regulator in and out of operation in response to an operative condition of the first regulator.

Another object of the invention is to provide a first variable resistance element for controlling the excitation of the field of a generator in response to output voltage, and a second variable resistance element in the field circuit of a generator for varying the effective turns in the field winding in accordance with the flow of the field current.

Another object of the invention is to provide a novel relay for connecting the second variable resistance element in and out of the field circuit in response to the voltage drop or rise of potential across the first variable resistance element.

These and other objects and features of the invention are pointed out in the following description in terms of the embodiment thereof which is shown in the accompanying drawing. It is to be understood, however, that the drawing is for the purpose of illustration only and is not designed as a definition of the limits of the invention, reference being had to the appended claims for this purpose.

In the drawing, there is illustrated diagrammatically one embodiment of the invention. Referring to the drawing there is indicated by the numeral 1, a generator driven by suitable power means and having a field winding 2 and output lines 3 and 4. The same is driven at a variable speed.

There is indicated diagrammatically by numeral 5 a variable resistance element which may be of the carbon pile type and having an armature 6, pivotally mounted at 7 and biased under tension of a spring 8 in a resistance decreasing direction.

Opposing the action of the spring 8 is an electromagnetic winding 9 which tends to adjust the armature 6 in a resistance increasing direction. The carbon pile regulator 5 may be of a type such

2 as shown and described in the copending application, Serial No. 612,691 by William G. Neild and filed August 25, 1945, now Patent 2,481,771, issued September 13, 1949.

The variable resistance element 5 is connected to the output line 3 by a conductor 10 which leads to one end of the resistance 5 through the armature 6. The opposite end of the resistance element 5 is connected through conductor 11 to a relay switch arm 13 normally biased to the position shown into contact with the switch contact 14. A conductor 15 leads from the contact 14 to one end of field winding 2. The opposite end of field winding 2 is connected to output line 4.

The electromagnetic winding 9 is connected across the output lines 3 and 4. The spring 8 is arranged so as to balance the pull on the armature 6 by the electromagnet 9 when the electromagnet 9 is energized by a voltage having a predetermined regulated value. The control winding 9 varies the resistance of the carbon pile 5 and the excitation of the field winding 2 so as to maintain a predetermined output voltage across the lines 3 and 4.

There is further provided as indicated diagrammatically by numeral 16 a variable resistance element which may be of the carbon pile type and having an armature 17 pivotally mounted at 18 and biased under tension of a spring 19 in a resistance decreasing direction.

Opposing the action of the spring 19 is an electromagnetic winding 20 which tends to adjust the armature 17 in a resistance increasing direction. The carbon pile regulator 16 may be of a type such as shown and described in the copending application Serial No. 612,691 by William G. Neild and filed August 25, 1945.

The variable resistance element 16 is connected at one end to the output line 4 by a conductor 21. The opposite end of the resistance element 16 is connected through armature 17 to conductor 22 and thereby to a switch contact 23 which is normally open.

A switch arm 24 normally biased to the open position shown is arranged so as to cooperate with switch contact 23 and close the same when in the upward position. A conductor 25 leads from the switch arm 24 to a center tap 26 on the field winding 2. It will be seen then that the variable resistance element 16 is shunted across a portion of the field winding 2 when the switch arm 24 is biased to the upward position so as to close contact 23.

The electromagnetic winding 20 is connected at one end by conductor 27 to conductor 15 while the opposite end is connected by conductor 28 to the conductor 11. It will be seen then that with the switch arm 13 biased to a position closing contact 14, as shown, the electromagnetic winding 20 is shunted out of operation, but upon the switch arm 13 opening the contact 14, the control winding 20 is connected in circuit with the resistance element 5 and field winding 2. Moreover, upon switch arm 24 closing contact 23 the variable resistance element 16 is shunted across that portion of the field winding 2 between contact 26 and output line 4.

Controlling the operation of the switch arms 13 and 24 is an electromagnetic relay winding 29 connected across the variable resistance element 5 by a conductor 30 connected to line 10 and a conductor 31 connected to line 11.

Thus upon the voltage drop or rise of potential across the variable resistance element 5 increasing to a predetermined maximum value, as upon the armature 10 approaching the maximum resistance adjusted position, the relay winding 29 causes switch arm 13 to open contact 14 and switch arm 24 to close contact 23 whereupon the variable resistance 16 and electromagnetic winding 20 are connected in operative relation.

The electromagnetic winding 20 is connected in series with the field winding 2 and the spring 19 is arranged so as to balance the opposing pull on the armature by the electromagnet 20 when the electromagnet 20 is energized by a current flow having a predetermined value.

In the operation of the foregoing system, it will be seen that at low generator speed the resistance of the carbon pile or resistance element 5 is sufficient to maintain the desired voltage at the output lines 3 and 4 and the current regulator 16 is cut out of operation by the action of relay 29 at a low adjusted resistance of the carbon pile 5.

The cutout relay 29 is so connected that it opens the circuit of the carbon pile 16 and shorts the control winding 20 during the foregoing low speed operation of the generator 1.

The shorting out of the control winding 20 permits the spring 19 to apply full pressure to the armature 15 and the carbon pile 16 so as to prevent vibration of the carbon discs forming the carbon pile 16 particularly when in use in aircraft.

The cutout relay winding 29 is energized by the voltage drop across the carbon pile or variable resistance element 5. The relay winding 29 is so arranged that it will cause switch arm 13 to open contact 14 and switch arm 24 to close contact 23 upon the resistance of carbon pile 5 being increased to a point slightly below where the current regulator is required as the speed of the generator is increased.

Under the latter conditions of increased generator speed it will be seen that the field current falls and the resistance of the carbon pile 5 is increasing so as to maintain the regulated voltage. This increase in resistance of the carbon pile 5 continues until the aforenoted predetermined point is reached whereupon the current regulator 16 is brought into operation by operation of the relay winding 29. The current regulator 16 will now prevent the field current from falling any lower, by progressively decreasing the resistance of the carbon pile 16 as the current tends to decrease. Thus the field current is maintained substantially constant by shorting out part of the field 2 by decreasing the resistance of pile 16. The shorting out of part of the field 2 reduces the effective turns in the field winding 2 and changes or holds the field current to produce the required ampere turns.

It will be seen moreover, that upon the resistance of the pile decreasing and shorting out or reducing the effective turns of the field 2 the voltage output of the generator 1 momentarily tends to decrease, whereupon the control winding 9 of the voltage regulator tends to slightly readjust the carbon pile 5 so as to maintain the voltage constant.

The relay winding 29 is so arranged as to permit the current regulator 16 to drop out of operation only upon the voltage drop across the resistance 5 decreasing to a predetermined point where the field current flow causes the control winding 20 to adjust the carbon pile 16 to a maximum resistance position.

It will be seen that the foregoing novel system of regulation provides means for effecting the regulation of a generator which requires a range of regulation greater than the capability of a single regulator.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In an electric power system, a dynamo, a field winding for the dynamo, a first variable resistance means in circuit with said field winding for regulating current input to said field winding, a first coil responsive to a function of the dynamo output for controlling said regulating means, a second variable resistance means to complete a shunt circuit around a portion of said field winding, and a second coil responsive to the current input to said field winding for regulating said shunt circuit.

2. In an electric power system, a dynamo, a field winding for the dynamo, a first variable resistance means in circuit with said field winding for regulating current input to said field winding, a first coil responsive to a function of the dynamo output for controlling said regulating means, a second variable resistance means to complete a shunt circuit around a portion of said field winding, a second coil responsive to the current input to said field winding for regulating said shunt circuit, and relay means responsive to a condition of said first variable resistance means for connecting said second variable resistance means in and out of operative relation.

3. In an electric power system, a dynamo, a field winding for the dynamo, a first variable resistance means in circuit with said field winding for regulating current input to said field winding, a first coil responsive to a function of the dynamo output for controlling said regulating means, a second variable resistance means to complete a shunt circuit around a portion of said field winding, a second coil responsive to the current input to said field winding for regulating said shunt circuit, and relay means responsive to a condition of said first variable resistance means for connecting said second coil in and out of operative relation.

4. In an electric power system, a dynamo, a field winding for the dynamo, a first variable resistance means in circuit with said field winding for regulating current input to said field winding, a first coil responsive to a function of the dynamo output for controlling said regulating means, a second variable resistance means to complete a shunt circuit around a portion of said field winding, a second coil responsive to the current input to said field winding for regulating said shunt circuit, and relay means responsive to a condition of said first variable resistance means for connecting said second variable resistance means and said second coil in and out of operative relation.

5. In an electric power system, a dynamo, a field winding for the dynamo, a first variable resistance means in circuit with said field winding for regulating current input to said field winding, a first coil responsive to a function of the dynamo output for controlling said regulating means, a second variable resistance means to complete a shunt circuit around a portion of said field winding, a second coil responsive to the current input to said field winding for regulating said shunt circuit, switch means for connecting said second variable resistance means and said second coil in and out of operative relation, and a relay coil shunted across said first variable resistance means for operating said switch means in response to a rise of potential across said first variable resistance means.

6. In an electric power system a dynamo, a field winding for the dynamo, means in series with said field winding for regulating the same, a coil responsive to a function of the dynamo output for controlling said regulating means, means operated by said regulating means and acting upon a predetermined adjustment thereof to effect a shunt circuit around at least a portion of said field winding, and means in said shunt circuit for regulating current flow to said field winding so as to maintain a predetermined current input.

7. In combination, a generator having a shunt field winding, a main variable pressure rheostat in series with said field winding, an auxiliary variable pressure rheostat in a shunt circuit around a portion of said field winding, a first controlling winding responsive to the output voltage of said generator, means whereby said first winding may operate said main rheostat, a second controlling winding connected in series with said main rheostat, and responsive to the current flow to said shunt field winding, means whereby said second winding may operate said auxiliary rheostat, said first controlling winding increasing the resistance of said main rheostat upon increase in output voltage to decrease the energization of said field winding, and said second controlling winding decreasing the resistance of said auxiliary rheostat upon a decrease in current flow to said field winding and thereby diverting current from said portion of the field winding so as to effect a substantially constant output voltage from said generator under varying driven speed conditions.

8. In combination a generator having a shunt field winding, a first variable resistance in series with said shunt field winding, a second variable resistance connected around a portion of said shunt field winding, means responsive to an output condition of the generator for varying said first variable resistance, means responsive to current flow to the field winding for varying said second variable resistance, and relay means for open circuiting said second resistance under predetermined conditions of the first variable resistance.

9. In a system of electrical regulation, a coil to be regulated, regulating means connected in series therewith in an electrical circuit, a shunt circuit adapted to be completed around a portion of said coil, another regulating means for said shunt circuit, an electro-magnetic winding controlled by said series regulating means, and means acting upon a predetermined energization of said winding to complete said shunt circuit.

10. In combination, a variable speed generator having a shunt field winding, regulating means in series with the shunt field and responsive to the voltage output of said generator, a shunt circuit adapted to be completed around a portion of said shunt field, other regulating means in said shunt circuit and responsive to the current input to said shunt field, a control winding responsive to a condition of said first regulating means, and means actuated by said control winding to complete said shunt circuit after a predetermined range of operation of said first regulating means has been effected.

11. In combination, a variable speed generator having a shunt field winding, regulating means in series with the shunt field and responsive to the voltage output of said generator, a shunt circuit adapted to be completed around a portion of said shunt field other regulating means in said shunt circuit and responsive to the current input to said shunt field, a control winding responsive to a condition of said first regulating means, and means actuated by said control winding to complete said shunt circuit after a predetermined range of operation of said first regulating means has been effected, and said first and second regulating means cooperating in maintaining the voltage output of the generator substantially constant under varying speed conditions of the generator.

12. For use with an electric power system including a dynamo and a field winding for the dynamo; the combination comprising a first variable pressure rheostat to control said field winding, a second variable pressure rheostat, means for regulating the pressure on the first rheostat in response to a condition of the dynamo, means responsive to current flow through the first rheostat to regulate the pressure on the second rheostat, and means effective to place said other means in operation upon a rise of potential across the first rheostat having reached a predetermined value.

13. For use with an electric power system including a dynamo and a field winding for the dynamo; means for regulating the energization of said field winding, said means including a regulating medium connected in an electrical circuit in series with said field winding, means to operate said regulating medium in response to a condition of said dynamo, an auxiliary regulating medium, means to control said auxiliary regulating medium in response to current flow through said first mentioned regulating medium, said auxiliary regulating medium adapted to be connected in shunt relation to at least a portion of said field winding, and relay means responsive to rise of potential across said first mentioned regulating medium for effecting operation of one of said mediums alone over a predetermined range and both of said mediums over another predetermined range.

14. For use with an electric power system including a dynamo and a field winding for the dynamo; the combination comprising means for regulating the excitation of said field winding in response to a condition of said dynamo, said means including a variable resistance connected in series with said field winding in an electrical circuit, a shunt circuit including a second variable resistance, means to control said second variable resistance in response to current flow through said first mentioned variable resistance, and relay means to complete said shunt around at least a portion of said field winding upon a predetermined rise of potential across said first mentioned variable resistance.

RALPH G. ADAMS.
JAMES H. JOHNSTON.

REFERENCES CITED

The following references are of record in the file of this patent:

UNITED STATES PATENTS

| Number | Name | Date |
|---|---|---|
| 1,131,176 | Turbayne | Mar. 9, 1915 |
| 2,427,809 | Rady et al. | Sept. 23, 1947 |